United States Patent
Xie et al.

(10) Patent No.: US 10,976,591 B2
(45) Date of Patent: Apr. 13, 2021

(54) COLOR FILTER SUBSTRATE AND METHOD FOR PREPARING THE SAME, AND TOUCH SCREEN

(71) Applicants: BOE Technology Group Co., Ltd., Beijing (CN); Hefei Xinsheng Optoelectronics Technology Co., Ltd., Anhui (CN)

(72) Inventors: Xiaodong Xie, Beijing (CN); Tsung-Chieh Kuo, Beijing (CN); Ming Zhang, Beijing (CN); Jing Wang, Beijing (CN); Yu Zhu, Beijing (CN); Yuzhao Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 8 days.

(21) Appl. No.: 15/774,852

(22) PCT Filed: Aug. 31, 2017

(86) PCT No.: PCT/CN2017/099931
§ 371 (c)(1),
(2) Date: May 9, 2018

(87) PCT Pub. No.: WO2018/133421
PCT Pub. Date: Jul. 26, 2018

(65) Prior Publication Data
US 2019/0258108 A1    Aug. 22, 2019

(30) Foreign Application Priority Data
Jan. 20, 2017    (CN) .......................... 201710041989.4

(51) Int. Cl.
*G02F 1/1335*    (2006.01)
*G02F 1/1333*    (2006.01)
(Continued)

(52) U.S. Cl.
CPC ...... *G02F 1/133514* (2013.01); *G02F 1/1343* (2013.01); *G02F 1/13338* (2013.01);
(Continued)

(58) Field of Classification Search
USPC ........................................................ 345/173
See application file for complete search history.

(56) References Cited

U.S. PATENT DOCUMENTS 9,329,730 B2    5/2016    Wang
9,990,068 B2    6/2018    Chen et al.
(Continued)

FOREIGN PATENT DOCUMENTS

CN    102650775 A    8/2012
CN    102955288 A    3/2013
(Continued)

OTHER PUBLICATIONS

Third Office Action, including Search Report, for Chinese Patent Application No. 201710041989.4, dated Mar. 15, 2019, 18 pages.
(Continued)

*Primary Examiner* — Amr A Awad
*Assistant Examiner* — Jonathan G Cooper
(74) *Attorney, Agent, or Firm* — Westman, Champlin & Koehler, P.A.

(57) ABSTRACT

A color filter substrate and a method for preparing the same, and a touch screen are provided in embodiments of the disclosure. The color filter substrate comprises: a base substrate; a plurality of first electrodes, on a first side of the base substrate and extending in a first direction; and a plurality of second electrodes, on a second side of the base
(Continued)

substrate opposite to the first side and extending in a second direction different from the first direction.

7 Claims, 6 Drawing Sheets

(51) Int. Cl.
    *G02F 1/1343*     (2006.01)
    *G06F 3/041*     (2006.01)

(52) U.S. Cl.
    CPC ............ *G06F 3/041* (2013.01); *G06F 3/0412* (2013.01); *G06F 2203/04103* (2013.01)

(56) References Cited

U.S. PATENT DOCUMENTS

| | | | | |
|---|---|---|---|---|
| 2012/0307185 A1* | 12/2012 | Wang | .................. | G02F 1/13338 349/106 |
| 2015/0054803 A1* | 2/2015 | Yashiro | ................... | G06F 3/041 345/206 |
| 2015/0130736 A1* | 5/2015 | Liu | ....................... | G06F 3/0412 345/173 |
| 2015/0253882 A1* | 9/2015 | Lee | ......................... | G06F 3/041 345/173 |
| 2016/0103531 A1* | 4/2016 | Kimura | ............... | G02F 1/13338 345/174 |
| 2016/0188070 A1* | 6/2016 | Ko | ....................... | G02F 1/13338 29/846 |
| 2016/0266678 A1 | 9/2016 | Wang et al. | | |
| 2017/0060309 A1 | 3/2017 | Chen et al. | | |
| 2017/0329436 A1* | 11/2017 | Choi | ....................... | G06F 3/041 |
| 2018/0254611 A1* | 9/2018 | Mayer | ..................... | H01S 5/423 |

FOREIGN PATENT DOCUMENTS

| | | |
|---|---|---|
| CN | 104461164 A | 3/2015 |
| CN | 104679374 A | 6/2015 |
| CN | 104865728 A | 8/2015 |
| CN | 106775125 A | 5/2017 |

OTHER PUBLICATIONS

International Search Report and Written Opinion, including English translation of Boxes I, II and V, of the Written Opinion, for International Application No. PCT/CN2017/099931, dated Dec. 1, 2017, 20 pages.

\* cited by examiner

| forming a plurality of first electrodes extending in a first direction, on a first side of a base substrate | — S101 |

| forming a plurality of second electrodes extending in a second direction different from the first direction, on a second side of the base substrate different from the first side | — S102 |

COLOR FILTER SUBSTRATE AND METHOD FOR PREPARING THE SAME, AND TOUCH SCREEN

CROSS-REFERENCE TO RELATED APPLICATION

This application is a Section 371 National Stage Application of International Application No. PCT/CN2017/099931, filed on Aug. 31, 2017, entitled "Color Filter Substrate And Method For Preparing The Same, And Touch Screen", which has not yet published, which claims priority to Chinese Application No. 201710041989.4, filed on Jan. 20, 2017, incorporated herein by reference in entirety.

FIELD

Embodiments of the present disclosure relate to the technical field of display, and in particular, to a color filter substrate and a method for preparing the same, and a touch screen.

BACKGROUND

In a touch panel, a touch position thereon which is touched by a user is determined by calculation of coordinates of a contact point within the rage of the panel, and the touch panel thus typically comprises a touch detecting portion and a touch controller. The touch detecting portion is for example mounted on a front face of the touch panel and used to detect the specific touch position by the user and then to transfer information concerning this detection to the touch controller. And the touch controller in turn converts such information into coordinates and sends the coordinates to a CPU; simultaneously, the touch controller receives signals which functions as a feedback from the CPU and performs operations depending thereon so as to implement a human-machine interaction.

During a process for preparing a touch panel, a specific quantity of mask plates may influence directly a product cost of the whole touch panel, therefore, a plurality of mask plates are required for preparation of touch electrodes in a relevant art.

SUMMARY

According to an aspect of the exemplary embodiment of the present disclosure, there is provided a color filter substrate, comprising: a base substrate; a plurality of first electrodes, on a first side of the base substrate and extending in a first direction; and a plurality of second electrodes, on a second side of the base substrate opposite to the first side and extending in a second direction different from the first direction.

According to an embodiment of the disclosure, the color filter substrate further comprises: black matrix, on a side of the plurality of first electrodes facing away from the base substrate; pixel regions and non-pixel regions are provided on the first side of the base substrate, an orthographic projection of the black matrix on the base substrate falling inside the non-pixel regions.

According to an embodiment of the disclosure, at least one of both the plurality of first electrodes and the plurality of second electrodes are metallic mesh electrodes, whose orthographic projections on the base substrate fall inside the non-pixel regions.

According to an embodiment of the disclosure, the plurality of first electrodes are metallic mesh electrodes and the plurality of second electrodes are transparent conductive electrodes.

According to an embodiment of the disclosure, the color filter substrate further comprises: metal wirings, on the first side of the base substrate, and at a same layer as and in electrical connection with the plurality of first electrodes.

According to an embodiment of the disclosure, silver nanowires are provided on the second side of the base substrate and in electrical connection with the plurality of second electrodes.

According to an embodiment of the disclosure, a polarizer is provided on a side of the plurality of second electrodes facing away from the base substrate.

According to an embodiment of the disclosure, the plurality of first electrodes are touch scanning electrodes and the plurality of second electrodes are touch sensing electrodes.

According to an embodiment of the disclosure, a material of the metallic mesh electrodes is chosen from one of silver and copper.

According to another aspect of the exemplary embodiment of the present disclosure, there is provided a touch screen, comprising the color filter substrate as above.

According to still another aspect of the exemplary embodiment of the present disclosure, there is provided a method for preparing a color filter substrate, comprising: forming a plurality of first electrodes extending in a first direction, on a first side of a base substrate; and forming a plurality of second electrodes extending in a second direction different from the first direction, on a second side of the base substrate opposite to the first side.

According to an embodiment of the disclosure, the method further comprises: providing pixel regions and non-pixel regions on the first side of the base substrate, and forming on a side of the plurality of first electrodes facing away from the base substrate black matrix whose orthographic projection on the base substrate falls inside the non-pixel regions, following forming a plurality of first electrodes extending in a first direction on a first side of a base substrate.

According to an embodiment of the disclosure, forming a plurality of first electrodes extending in a first direction on a first side of a base substrate comprises: forming a metal film on the first side of the base substrate; and performing a patterning process on the metal film so as to form patterns of the plurality of first electrodes, the plurality of first electrodes being shaped in a form of a metal mesh, and forming a plurality of second electrodes extending in a second direction different from the first direction on a second side of the base substrate opposite to the first side comprises: forming a transparent conductive film on the second side of the base substrate; and performing another patterning process on the transparent conductive film so as to form patterns of the plurality of second electrodes.

According to an embodiment of the disclosure, the method further comprises: forming patterns of metal wirings simultaneously when performing a patterning process on the metal film so as to form patterns of the plurality of first electrodes, the metal wirings being connected electrically with the plurality of first electrodes.

According to an embodiment of the disclosure, the method further comprises: forming on the second side of the base substrate silver nanowires connected electrically with the plurality of second electrodes, following forming a plurality of second electrodes extending in a second direction different from the first direction on a second side of the base substrate opposite to the first side.

According to an embodiment of the disclosure, a material of the plurality of first electrodes is one of silver and copper.

According to an embodiment of the disclosure, the second direction is perpendicular to the first direction.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF EMBODIMENTS

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of a color filter substrate and a touch screen according to embodiments of the disclosure.

Figure 1:
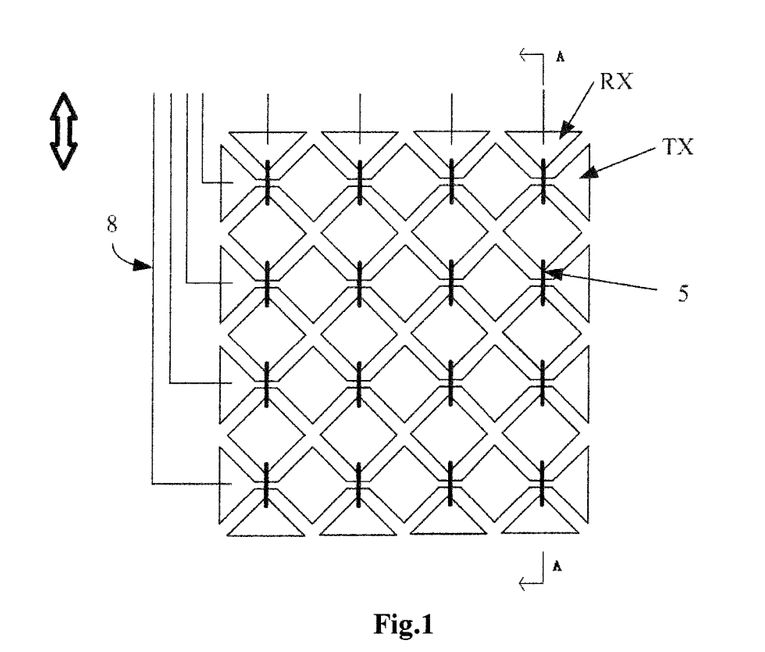
FIG. 1 illustrates a top view of a touch screen.
Figure 2:
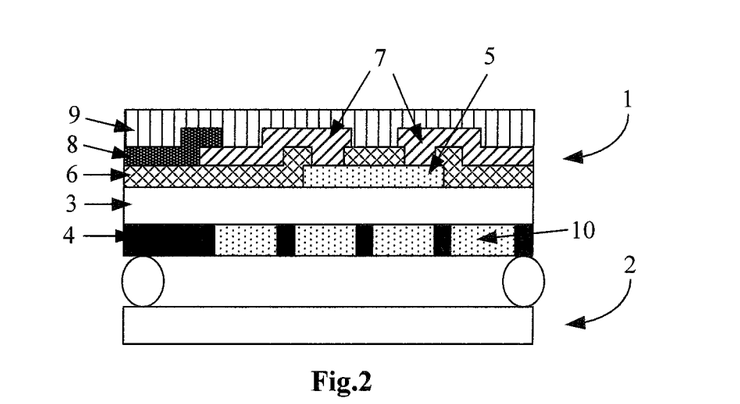
FIG. 2 illustrates a sectional schematic view of the touch screen as illustrated in FIG. 1 along a line A-A therein.

FIG. 1 illustrates a top view of a touch screen of a display panel of the relevant art, and FIG. 2 illustrates a sectional schematic view of the touch screen as illustrated in FIG. 1 along a line A-A therein. As illustrated in FIGS. 1 and 2, the touch screen comprises: an array substrate 2 and a color filter substrate 1 opposite to each other. The color filter substrate 1 comprises a base substrate 3, and the base substrate 3 is provided with not only a color filter layer at a side thereof proximate to the array substrate 2 (i.e., a side thereof facing the array substrate 2) but also patterns of a plurality of bridge lines 5 extending in a first direction (e.g., a direction indicated by a double-headed arrow as illustrated in FIG. 1) at another side thereof away from the array substrate 2 (i.e., another side thereof facing away from the array substrate 2). The color filter layer comprises black matrix 4 and colored matrix patterns 10 both of which are arranged to intersect and alternate with each other. And the patterns of the plurality of bridge lines 5 are generally formed by a material, e.g., Indium tin oxide (ITO) and have an insulating layer 6 provided as a whole layer thereon. The insulating layer 6 is provided with via-holes at locations thereof corresponding to the patterns of the bridge lines 5, and provided with an electrode layer thereon corresponding to a display area of the display panel. The electrode layer is generally formed by ITO material, and comprises: a plurality of first electrodes extending in a second direction (i.e., perpendicular to the first direction) and in parallel with one another, e.g., a plurality of line electrodes extending in the second direction; and a plurality of sub-electrodes 7, e.g., block electrodes arranged in the same layer as the plurality of first electrodes and spaced apart therefrom. Furthermore, the sub-electrodes 7 which are adjacent to each other or one another in the first direction are electrically connected with the bridge lines 5 therebelow, through the via-holes so as to construct a plurality of second electrodes extending in the first direction. As illustrated in FIG. 2, a horizontal direction as illustrated in FIG. 2 is the first direction, and the sub-electrodes 7 which are adjacent to each other in the first direction are connected electrically with the bridge lines 5 provided therebelow through the via-holes, so as to form the plurality of second electrodes extending in the first direction. Referring to FIG. 1 again, a vertical direction as illustrated by the double-headed arrow in FIG. 1 is the first direction, and a horizontal direction in FIG. 1 perpendicular thereto is the second direction, and the plurality of first electrodes extend in the second direction respectively, while the plurality of second electrodes formed by connecting the sub-electrodes 7 electrically by the bridge lines 5 extend in the first direction. One of both the plurality of first electrodes and the plurality of second electrodes are touch driving electrodes TX, while the other one of both the plurality of first electrodes and the plurality of second electrodes are touch sensing electrodes RX; and in a specific embodiments, e.g., as illustrated in FIG. 1, the plurality of first electrodes extending in the second direction are touch driving electrodes TX, and the plurality of second electrodes extending in the first direction are touch sensing electrodes RX. Metal wirings 8 are provided above the insulating layer 6 corresponding to surrounding regions (which regions surround the display area), which metal wirings 8 are used for electrical connection between a touch controller and various electrodes for touch detection. And a polarizer 9 is laid as a whole layer on the metal wirings 8 and the electrode layer. The touch controller receives information concerning the touch position by the user which information is detected by a touch detecting portion, and converts the information into coordinates and sends the coordinates to a central processing unit (CPU); meanwhile the touch controller also receives signals which function as a feedback from the CPU and performs operations as instructed thereby, so as to implement a human-machine interaction.

In above technologies, in order to form touch electrode portions (i.e., touch driving electrodes TX and touch sensing electrodes RX), three patterning processes are required, for forming patterns of the bridge lines, forming the via-holes on the insulating layer 6, and forming patterns of various electrodes in the electrode layer, respectively.

In processes for preparing the touch screen, a specific quantity of mask plates may influence an overall production cost of the whole touch screen directly. And in relevant prior art as above, three mask plates are required for the three patterning processes as above respectively, so as to prepare the touch electrodes finally.

Figure 3:
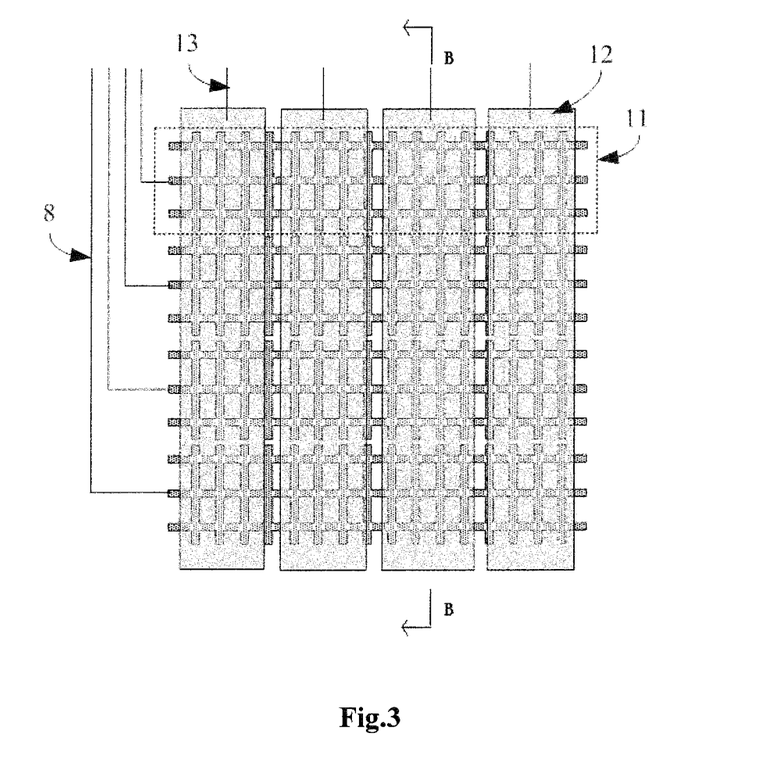
FIG. 3 illustrates a top view of a color filter substrate provided in embodiments of the disclosure.
Figure 4:
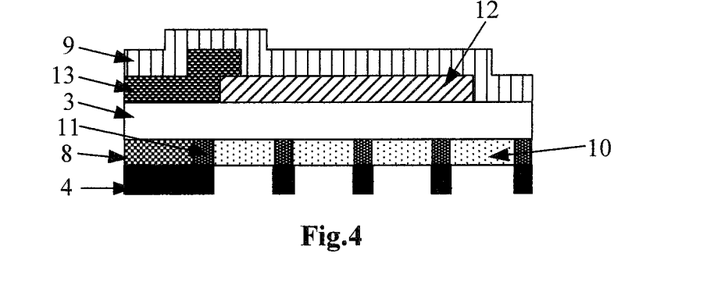
FIG. 4 illustrates a sectional schematic view of the color filter substrate as illustrate in FIG. 3 along a line B-B therein.

FIG. 3 illustrates a top view of a color filter substrate provided in embodiments of the disclosure, and FIG. 4 illustrates a sectional schematic view of the color filter substrate as illustrate in FIG. 3 along a line B-B therein. As illustrated in FIGS. 3 and 4, according to a general technical concept of the present disclosure, there is provided a color filter substrate, comprising: a base substrate 3; a plurality of first electrodes 11, which are arranged on a first side (e.g., a lower side as illustrated) of the base substrate 3 and extend in a first direction; and a plurality of second electrodes 12, which are arranged on a second side (e.g., an upper side as illustrated) of the base substrate opposite to the first side and extend in a second direction, the second direction being different from the first direction, e.g., the second direction intersects the first direction. In a further embodiment, the second direction is for example perpendicular to the first direction. One of both the plurality of first electrodes 11 and the plurality of second electrodes 12 are touch scanning electrodes, and the other one of both the plurality of first electrodes 11 and the plurality of second electrodes 12 are touch sensing electrodes In an embodiment of the disclosure, by way of example, a horizontal direction as illustrated in FIG. 3 is the first direction, and a vertical direction as illustrated in FIG. 3 is the second direction, without any limitation on technical solutions of embodiments of the disclosure, only if it is ensured that the first direction and the second direction intersect each other in these embodiments.

It should be noticed that, in embodiments of the disclosure, a "first side" of the base substrate 3 refers to a side thereof facing an array substrate in condition that the color filter substrate aligns and assembles with the array substrate provided therebelow; and the base substrate 3 is generally provided with black matrix 4 and colored matrix patterns 10 at the first side thereof. The black matrix 4 is located within non-pixel regions at the first side of the base substrate 3, i.e., at the side of the plurality of first electrodes facing away from the base substrate 3, with a plurality of pixel regions being formed between adjacent black matrix 4 and the colored matrix patterns 10 in turn being located within the plurality of pixel regions. Correspondingly, a "second side" of the base substrate 3 refers to a side thereof facing away from the array substrate in a condition that the color filter substrate aligns and assembles with the array substrate provided therebelow; and the base substrate 3 is generally provided with a polarizer 9 at the second side thereof.

In embodiments of the disclosure, since the plurality of first electrodes 11 which function as one of both touch scanning electrodes and touch sensing electrodes, which touch scanning electrodes and touch sensing electrodes achieve touch function, are placed on a side of the base substrate 3, while the plurality of second electrodes 12 which function as the other one of both touch scanning electrodes and touch sensing electrodes are placed on the other side (i.e., opposite side) of the base substrate 3, respectively, therefore, two patterning processes are carried out on both sides of the base substrate 3, respectively, i.e., each patterning process for a single side, so as to form patterns of both touch scanning electrodes and touch sensing electrodes corresponding to above two patterning processes, with only two mask plates. In other words, essentially, since the plurality of first electrodes 11 and the plurality of second electrodes 12 are placed on both sides of the base substrate 3, respectively, i.e., each type for a single side, rather than being placed necessarily on a same side of the base substrate 3, then, steps for providing insulating layer and forming the via-holes on the insulating layer are eliminated, so as to exclude a patterning process, i.e., to exclude a mask plate. It should be noticed that, said patterning processes in embodiments of the disclosure comprise specific processes such as: coating with photoresist, exposure, development, etching, and peeling off the photoresist, and the like.

As stated above, it can be seen that, in processes for preparing color filter substrate as provided in embodiments of the disclosure, only two mask plates are required to prepare the touch electrode portions, so as to decrease effectively specific quantity of mask plates used for preparing the same in the preparation of the color filter substrate and in turn to decrease overall product cost. In addition, since the base substrate 3 is located between the touch scanning electrodes and the touch sensing electrodes, an electrical insulation between the touch scanning electrodes and the touch sensing electrodes may thus be secured. And since it is not required to provide any additional insulating layer therebetween, then an overall thickness of the color filter substrate formed as a finished product may be decreased, facilitating implementation of a slimmer touch screen.

In order to enhance touch properties of the color filter substrate, for example, the plurality of first electrodes 11 and/or the plurality of second electrodes 12 are metallic mesh electrodes. Specific material of the metallic mesh electrodes may for example be metal material(s), such as silver, copper and the like. Patterns of the metallic mesh electrodes which are electrically conductive may be formed by growth of the metal material(s) on glass or plastic film such as PET and the like. The metallic mesh electrodes have a lower electrical resistivity than that of ITO material, and thus have a better resistance to bending/flexure than ITO material. As mentioned above, the plurality of first electrodes may extend in the first direction, and the plurality of second electrodes may extend in the second direction. In a condition that the plurality of first electrodes 11 and/or the plurality of second electrode 12 are metallic mesh electrodes, the metallic mesh electrodes have both lengthwise dimension(s) and widthwise/transverse dimension(s) smaller than, and typically, much smaller than the widthwise/transverse dimension(s).

The metallic mesh electrodes extending in the first direction or the second direction means that a lengthwise direction (i.e., a longitudinal direction in which the metallic mesh electrodes extend/are elongated) thereof is just the first or the second direction. At least one of both the plurality of first electrodes 11 and the plurality of second electrodes 12 are set as the metallic mesh electrodes, which measure may enhance sensitivity in touch detection by the touch detecting portion effectively. Moreover, as compared with the ITO material which functions as the material of the touch electrodes in the relevant art, metallic material are used as alternative material for the touch electrodes in embodiments of the disclosure and may in turn decrease production cost effectively. The metallic mesh patterns of the metallic mesh electrodes may for example be regular patterns, which may cover several pixel electrodes; or alternatively, the metallic mesh patterns of the metallic mesh electrodes may for example be irregular patterns, which may be provided with concave or convex patterns.

Once the metallic mesh electrodes are introduced, it may readily be observed by the user some Moiré patterns on a corresponding surface of the color filter substrate, which are caused by the metallic mesh electrodes, resulting in an interferential effect on user's visual experience. In embodiments of the disclosure, the locations at which the metallic mesh electrodes are provided may be designed correspondingly, to be specific, e.g., such that orthographic projections of the metallic mesh electrodes on the base substrate 3 may be arranged to fall inside the non-pixel regions, resulting in the regions/locations where the metallic mesh electrodes are located being completely covered with or by the black matrix 4, thus the metallic mesh electrodes may not be observed by the user, so as to eliminate Moiré patterns.

Figure 5:
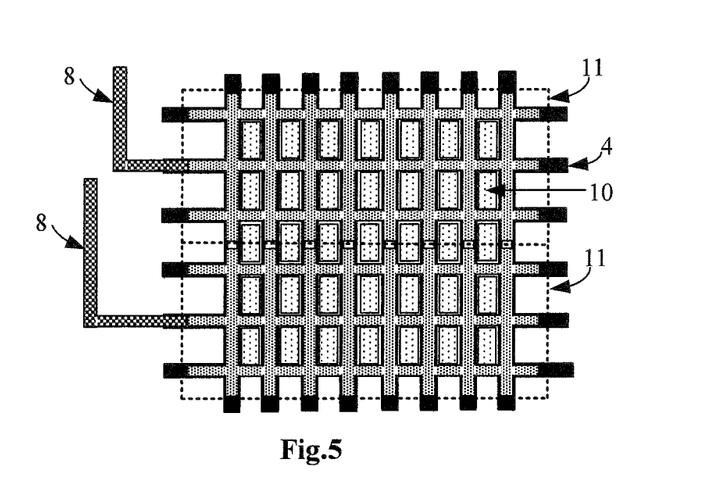
FIG. 5 illustrates a schematic view of the plurality of first electrodes functioning as metallic mesh electrodes.

FIG. 5 illustrates a schematic view of the plurality of first electrodes functioning as metallic mesh electrodes. As illustrated in FIG. 5, touch capabilities/properties of the color filter substrate may be enhanced maximally by designing both the plurality of first electrodes 11 and the plurality of second electrodes 12 as the metallic mesh electrodes, however, when the metallic mesh electrodes are being prepared on the second side of the base substrate 3, it may be difficult to arrange the metallic mesh electrodes in an accurate alignment thereof with the black matrix 4 provided on the first side of the base substrate 3 in practical processes, and thus the Moiré patterns may be caused once there is a deviation therebetween in alignment process. Therefore, in embodiments of the disclosure, in consideration of difficulty in alignment in practical processes, the material for manufacturing the base substrate may be chosen to be a transparent material; and then, by way of example, the plurality of first electrodes 11 located at the first side of the base substrate may be manufactured as metallic mesh electrodes while the plurality of second electrodes 12 located at the second side of the base substrate may be manufactured as transparent conductive electrodes, facilitating an accurate alignment therebetween during the preparation of both the plurality of first electrodes 11 and the plurality of second electrodes 12. For example, the transparent material for manufacturing the transparent conductive electrodes which function as the plurality of second electrodes may be ITO material.

It should be noticed that, the transparent conductive electrodes in embodiments of the disclosure may for example be electrodes formed by a plurality of strip-shaped or diamond-shaped electrodes connected in series, or alternatively be chosen as electrodes of other shape(s), without being further exemplified one by one herein in detail.

In a further embodiment of the disclosure, a plurality of metal wirings 8 may further be provided on the first side of the base substrate 3, on a same layer as the plurality of first electrodes 11, each of the plurality of metal wirings 8 being connected with a corresponding one of the plurality of first electrodes 11 for implementing an electrical connection between the plurality of first electrodes 11 and the touch controller. In this embodiment, since the plurality of metal wirings 8 are in the same layer as the plurality of first electrodes 11 (i.e., metallic mesh electrodes) and both are formed by metallic material(s), then both the plurality of metal wirings 8 and the plurality of first electrodes 11 may be prepared simultaneously with just one patterning process. Therefore it may be seen that, during a preparation of the plurality of metal wirings 8 and the plurality of first electrodes 11, only one mask plate is required.

In a further embodiment of the disclosure, a plurality of silver nanowires 13 connected with the plurality of second electrodes 12 respectively may be further provided on the second side of the base substrate 3, for implementing an electrical connection between corresponding ones of the plurality of second electrodes 12 and the touch controller. In this embodiment, the silver nanowires 13 may be formed by inkjet printing of nano-silver paste, without any mask plate.

According to above contents, in processes of preparing the color filter substrate as provided in embodiments of the disclosure, in order to prepare the touch detecting portion (i.e., touch electrodes and wirings), only two mask plates are required (one mask plate is used to prepare the metal wirings 8 and the plurality of first electrodes 11, while the other mask plate is used to prepare the plurality of second electrodes 12); however a plurality of mask plates are required in the relevant art, e.g., four mask plates are used, for forming the bridge lines, for forming the via-holes through a first insulating layer, for forming the sub-electrodes, and for forming additional metal wirings (e.g., used for the plurality of first electrodes), respectively. Therefore, technical solutions of the embodiments of the disclosure may reduce effectively the number of the mask plates used in preparing the touch detecting portion in the preparation of the color filter substrate, so as to decrease the production cost effectively.

In the embodiment of the disclosure, once the alignment and assembly between the color filter substrate and the array substrate provided therebelow are completed, since the plurality of first electrodes 11 are provided on the first side (illustrated as the lower side) of the base substrate 3 and the array substrate 2 is also provided below the base substrate 3 such that the plurality of first electrodes 11 are located closer to the array substrate 2 than the plurality of second electrodes 12, resulting in an interference applied by electronic devices disposed on the array substrate 2 on signals transmitted in the plurality of first electrodes 11; and in consideration that the touch sensing electrodes have a relatively weaker resistance to the interference as compared with the touch scanning electrodes (since a touch scanning signal or touch scanning signals at a constant voltage may be applied in the touch scanning electrodes when a touch-recognition task is being implemented), then in an exemplary embodiment of the disclosure, by way of example, the plurality of first electrodes 11 are chosen to function as the touch scanning electrodes while the plurality of second electrodes 12 are chosen to function as the touch sensing electrodes. In such a condition, since the plurality of first electrodes 11 have relatively stronger resistance to the interference and the plurality of second electrodes 12 are less interfered with due to an electric shielding effect by the base substrate 3, then the technical solutions in embodiments of the disclosure may ensure effectively an accurate result in the touch recognition thereby.

In a condition that the plurality of first electrodes 11 are touch scanning electrodes, and the plurality of second electrodes 12 are touch sensing electrodes, the metal wirings 8 are configured to connect the plurality of first electrodes 11 with a touch driving unit in the touch controller, and the touch driving unit is configured to output the touch scanning signal(s) to the plurality of first electrodes 11. And the plurality of silver nanowires 13 are configured to connect the plurality of second electrodes 12 with a touch detecting unit in the touch controller, and the touch detecting unit is configured to receive a touch induction signal or touch induction signals generated in the plurality of second electrodes 12.

It should be noticed that, it is an exemplary solution in embodiments of the disclosure that the plurality of first electrodes 11 as above are chosen to be the metallic mesh electrodes, while the plurality of second electrodes 12 are chosen to be transparent conductive electrodes, which solution may enhance the touch capabilities/properties of the color filter substrate maximally and avoid occurrence of the Moiré patterns effectively, without applying any limitation on the technical solutions in the embodiments of the disclosure. And it should be known to those skilled in the art that, the plurality of first electrodes 11 in embodiments of the disclosure may be chosen to be either the metallic mesh electrodes or the transparent conductive electrodes, and similarly, the plurality of second electrodes 11 may be chosen to be either the metallic mesh electrodes or the transparent conductive electrodes, and any combination therebetween may not be further exemplified one by one herein in detail.

Furthermore, in order to reduce the specific number of the mask plates used in the preparation of the touch detecting portion, some signal wirings for connection with the metallic mesh electrodes may for example be chosen to be metal wirings, such that they may be prepared together with the metallic mesh electrodes using only one mask plate. And some other signal wirings for connection with the transparent conductive electrodes may for example be chosen to be silver nanowires, such that the silver nanowires may be formed by inkjet printing of nano-silver paste, without any mask plate therefor.

A touch substrate is provided in embodiments of the disclosure. By providing the touch scanning electrodes on one side of the base substrate and providing the touch sensing electrodes on the other side (i.e., opposite side) of base substrate, respectively, and implementing two patterning processes at the two sides (i.e., each patterning process for a corresponding side) respectively, then patterns of both the touch scanning electrodes and the touch sensing electrodes achieving the touch function are formed respectively by above two patterning processes, with only two mask plates, which may reduce effectively the number of mask plates used in the process for preparing the touch electrode portions in the preparation of the color filter substrate, resulting in a reduced production cost, effectively.

Figure 6:
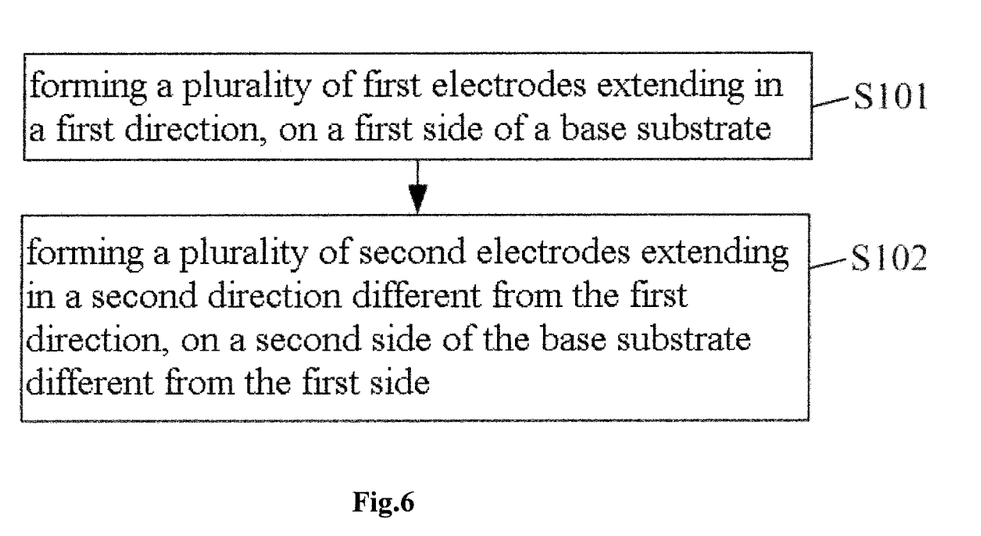
FIG. 6 illustrates a flow chart of a method for preparing a color filter substrate as provided in embodiments of the disclosure.

FIG. 6 illustrates a flow chart of a method for preparing a color filter substrate as provided in embodiments of the disclosure. As illustrated in FIG. 6, the method for preparing a touch screen may be used to prepare the color filter substrate according to above embodiments of the disclosure, which method comprises:

Step S101: forming a plurality of first electrodes extending in a first direction, on a first side of a base substrate; and Step S102: forming a plurality of second electrodes extending in a second direction different from the first direction, on a second side of the base substrate opposite to the first side.

One of both the plurality of first electrodes 11 and the plurality of second electrodes 12 are touch scanning electrodes while the other one of both the plurality of first electrodes 11 and the plurality of second electrodes 12 are touch sensing electrodes.

In an embodiment of the disclosure, a patterning process may be applied on one side of the base substrate 3 while an additional patterning process may be applied on the other side of the base substrate 3, so as to form patterns of both the touch scanning electrodes and the touch sensing electrodes respectively by above two patterning processes, with only two mask plates, which may reduce effectively the number of mask plates used in the process for preparing the touch electrode portions in the preparation of the color filter substrate, resulting in a reduced production cost, effectively.

It should be noticed that, the step S102 is carried out once the alignment and assembly between the color filter substrate and the array substrate 2 is completed. In the embodiment, by way of example, the method further comprises a step of providing black matrix 4 on a side of the plurality of first electrodes 11 facing away from the base substrate 3 at locations corresponding to the non-pixel regions, and forming colored matrix patterns 10 within the pixel regions defined among adjacent black matrix, after the plurality of first electrodes 11 are formed and before the alignment and assembly between the color filter substrate and the array substrate is implemented.

In addition, in case that a common electrode is further provided on the color filter substrate, then the method further comprises steps of forming the common electrode and forming an alignment film before the alignment and assembly. And in case that there is no common electrode provided on the color filter substrate, then the method further comprises a step of forming the alignment film before the alignment and assembly. It should be noticed that, the steps of forming the black matrix 4, the colored matrix patterns 10, the common electrode and the alignment film are relevant processes in the art, whose specific processes may not be set forth herein in detail.

In an embodiment of the disclosure, the plurality of first electrodes 11 and/or the plurality of second electrodes 12 are metallic mesh electrodes. At least one of both the plurality of first electrodes 11 and the plurality of second electrodes 12 are set as the metallic mesh electrodes, which measure may enhance sensitivity of the touch detecting portion effectively.

A method for preparing a color filter substrate is provided in embodiments of the disclosure. By implementing two patterning processes at the two sides of the base substrate 3 (i.e., each patterning process for a corresponding side), respectively, then patterns of both the touch scanning electrodes and the touch sensing electrodes are formed, respectively, which may reduce effectively the number of mask plates used in the process for preparing the touch electrode portions in the preparation of the color filter substrate, resulting in a reduced production cost, effectively.

Figure 7:
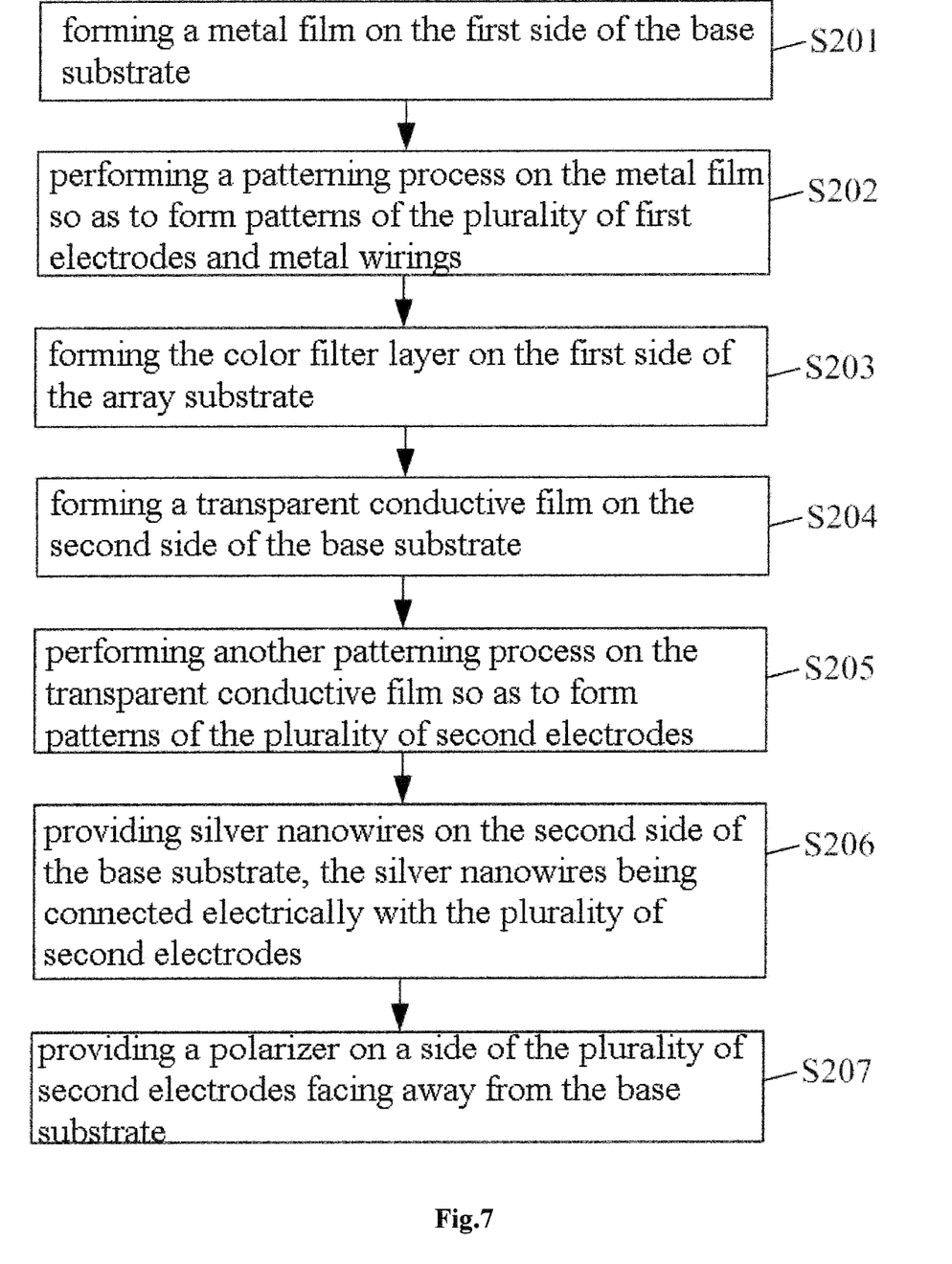
FIG. 7 illustrates a flow chart of a method for preparing a color filter substrate as provided in embodiments of the disclosure.

FIG. 7 illustrates a flow chart of a method for preparing a color filter substrate as provided in embodiments of the disclosure; and FIG. 8a~8f illustrate schematic views of structures of the color filter substrate as illustrated in FIG. 3 in intermediate processes during a preparation thereof. As illustrated in FIG. 7 and FIG. 8a~8f, the method is used to prepare the color filter substrate as illustrated in FIG. 3, which method comprises:

Step S201: forming a metal film on the first side of the base substrate; and

In the step S201, the metal film may typically be formed by various ways, such as deposition, coating, and sputtering and the like. And the first side of the base substrate 3 is for example as illustrated as the lower side of the base substrate 3 as in FIG. 8a.

The method further comprises Step S202, i.e., performing a patterning process on the metal film so as to form patterns of the plurality of first electrodes and metal wirings.

Figure 8A:
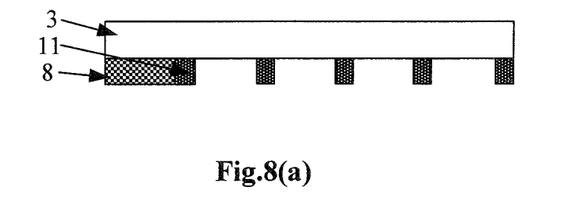
FIG. 8a-8f illustrate schematic views of structures of the color filter substrate as illustrated in FIG. 3 in intermediate processes during a preparation thereof.

As to the step S202, as illustrated in FIG. 8a, the plurality of first electrodes 11 function as the touch scanning electrodes which are provided corresponding to the non-pixel regions and extend in the first direction; and the metal wirings 8 are located in surrounding regions (which regions surround the display area) of the base substrate and connected with corresponding ones of the plurality of first electrodes 11.

In the step S202, the plurality of first electrodes 11 and the metal wirings 8 are prepared simultaneously by just one patterning process, which may effectively simplify processes of preparation and reduce the number of mask plates as required, resulting in a reduced production cost, effectively.

In addition, the plurality of first electrodes 11 of metallic mesh shape may be located in the non-pixel regions, and may thus be covered by the black matrix 4 formed subsequently so as to avoid any occurrence of the Moiré patterns.

The method further comprises Step S203, i.e., forming the color filter layer on the first side of the array substrate.

Figure 8B:
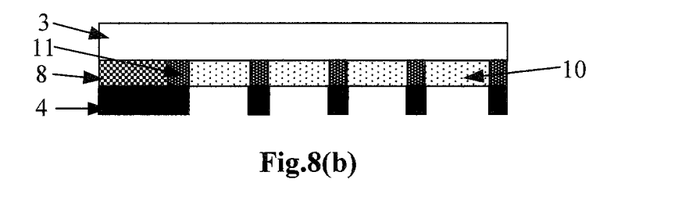

As illustrated in FIG. 8*b*, the step S203 specifically comprises: forming the black matrix 4 on a side of the plurality of first electrodes 11 facing away from the base substrate 3 and at locations corresponding to the non-pixel regions, and forming colored matrix patterns on a side of the array substrate 3 facing the black matrix 4 and at locations corresponding to the pixel regions.

Figure 8C:
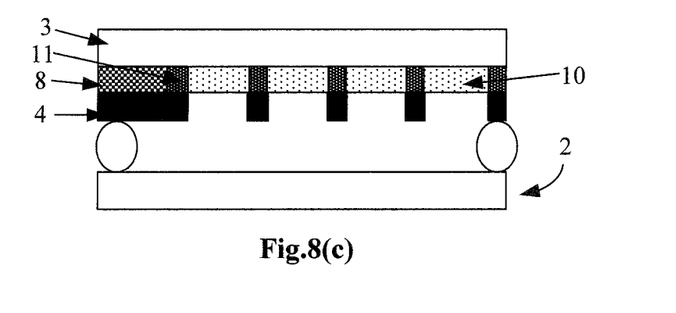

As illustrated in FIG. 8*c*, after the step S203, some structure such as the common electrode, the alignment film and the like may be prepared with relevant processes for color filter substrate, and the color filter substrate and the array substrate 2 which is prepared in advance may be aligned and assembled. Once the alignment and assembly is completed, the following step(s) may be implemented.

The method further comprises Step S204, i.e., forming a transparent conductive film on the second side of the base substrate.

Figure 8D:
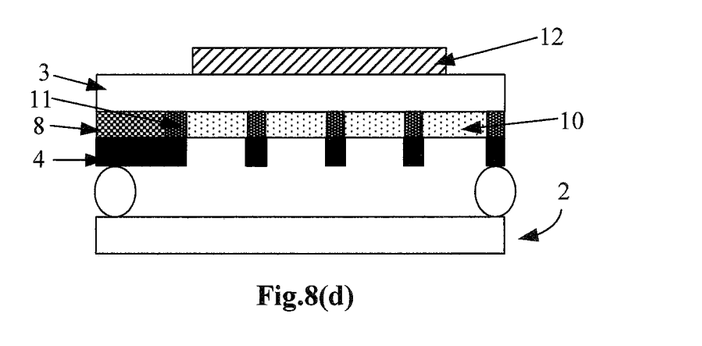

As illustrated in FIG. 8*d*, once the alignment and assembly between the color filter substrate and the array substrate 2 is completed, then, a transparent conductive film may be formed on an external side of the color filter substrate (i.e., the second side of the base substrate 3, e.g., the upper side as illustrated).

The method further comprises Step S205, i.e., performing another patterning process on the transparent conductive film so as to form patterns of the plurality of second electrodes.

The plurality of second electrodes 12 function as touch sensing electrodes which extend in the second direction. And the plurality of second electrodes 12 may for example be electrodes formed by a plurality of strip-shaped or diamond-shaped electrode connected in series.

The method further comprises Step S206, i.e., providing silver nanowires on the second side of the base substrate, the silver nanowires being connected electrically with the plurality of second electrodes.

Figure 8E:
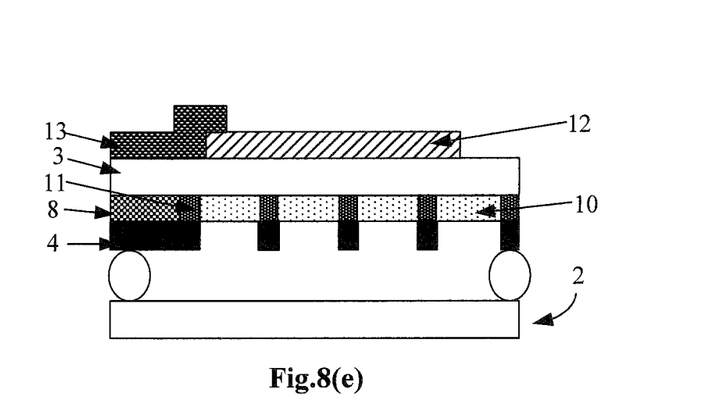

As illustrated in FIG. 8*e*, the silver nanowires 13 may be formed by inkjet printing of nano-silver paste, without any mask plate, resulting in an effective decrease in production cost.

Once the step S206 is completed, a liquid crystal cell thus formed may be processed by cutting and splitting, and then a step S207 may be implemented once the process of splitting is completed.

The method further comprises Step S207, i.e., providing a polarizer on a side of the plurality of second electrodes facing away from the base substrate.

Figure 8F:
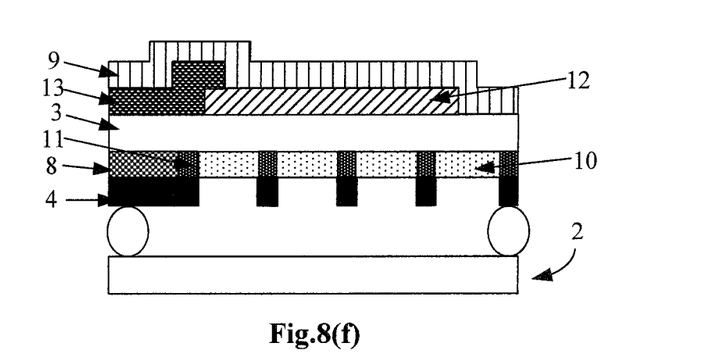

Further referring to FIG. 8*f*, once the process of splitting is completed, the polarizer 9 is provide on an external side of the color filter substrate.

There are at least one of numerous beneficial technical effects brought about by the technical solutions provided by the embodiments of the disclosure, as follows:

The method for preparing the color filter substrate is provided in embodiments of the disclosure. By implementing two patterning processes at the two sides of the base substrate (i.e., each patterning process for a corresponding side) respectively, then patterns of both the touch scanning electrodes and the touch sensing electrodes are formed respectively, which may reduce effectively the number of mask plates used in the process for preparing the touch electrode portions in the preparation of the color filter substrate, resulting in a reduced production cost, effectively. Moreover, the plurality of first electrodes may be metallic mesh electrodes which are provided corresponding to the non-pixel regions, which may not only enhance the touch capabilities/properties of the display screen but also avoid occurrence of the Moiré patterns effectively. And a touch screen is also provided in embodiments of the disclosure, comprising the color filter substrate as in above embodiments, which may refer to above depiction, without repeating such any more.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A method for preparing a color filter substrate, comprising:

forming a plurality of first electrodes extending in a first direction, on a first side of a base substrate; and forming a plurality of second electrodes extending in a second direction different from the first direction, on a second side of the base substrate opposite to the first side;

wherein the plurality of second electrodes are formed by a plurality of diamond-shaped electrodes connected in series;

wherein the method further comprises:

defining pixel regions and non-pixel regions on the first side of the base substrate;

forming black matrix on a side of the plurality of first electrodes facing away from the base substrate, within the non-pixels regions; and forming colored matrix patterns on a side of the base substrate facing the black matrix, within the pixel regions, after forming the plurality of first electrodes extending in the first direction on the first side of the base substrate but before forming the plurality of second electrodes extending in the second direction different from the first direction on the second side of the base substrate opposite to the first side, an orthographic projection of the black matrix failing to at least partially overlap with an orthographic projection of the colored matrix patterns in each of the first direction and the second direction; and forming on the second side of the base substrate silver nanowires connected electrically with the plurality of second electrodes, by inkjet printing of nano-silver paste, without any mask plate, after forming the plurality of second electrodes extending in the second direction different from the first direction, on the second side of the base substrate opposite to the first side.

2. The method according to claim 1, wherein the second direction is perpendicular to the first direction.

3. The method according to claim 1, wherein an orthographic projection of the black matrix on the base substrate falls inside the non-pixel regions.

4. The method according to claim 3, wherein forming a plurality of first electrodes extending in a first direction on a first side of a base substrate comprises:
  forming a metal film on the first side of the base substrate; and
  performing a patterning process on the metal film so as to form patterns of the plurality of first electrodes, the plurality of first electrodes being shaped in a form of a metal mesh, and wherein forming a plurality of second electrodes extending in a second direction different from the first direction on a second side of the base substrate opposite to the first side comprises:
  forming a transparent conductive film on the second side of the base substrate; and
  performing another patterning process on the transparent conductive film so as to form patterns of the plurality of second electrodes.

5. The method according to claim 4, further comprising: forming patterns of metal wirings simultaneously when performing a patterning process on the metal film so as to form patterns of the plurality of first electrodes, the metal wirings being connected electrically with the plurality of first electrodes.

6. The method according to claim 4, wherein a material of the plurality of first electrodes is one of silver and copper.

7. A method for preparing a color filter substrate, comprising:

forming a plurality of first electrodes extending in a first direction, on a first side of a base substrate; and forming a plurality of second electrodes extending in a second direction different from the first direction, on a second side of the base substrate opposite to the first side;

wherein the plurality of second electrodes are formed by a plurality of diamond-shaped electrodes connected in series;

wherein the method further comprises:

defining pixel regions and non-pixel regions on the first side of the base substrate;

forming black matrix on a side of the plurality of first electrodes and to be spaced apart from the base substrate by the plurality of first electrodes, within the non-pixels regions; and forming colored matrix patterns on a side of the base substrate by directly abutting against the base substrate, within the pixel regions, after forming the plurality of first electrodes extending in the first direction on the first side of the base substrate but before forming the plurality of second electrodes extending in the second direction different from the first direction on the second side of the base substrate opposite to the first side, the side of the plurality of first electrodes where the black matrix is located facing away from the base substrate, and the side of the base substrate where the colored matrix patterns are located facing the black matrix, and an orthographic projection of the black matrix failing to at least partially overlap with an orthographic projection of the colored matrix patterns in each of the first direction and the second direction; and forming on the second side of the base substrate silver nanowires connected electrically with the plurality of second electrodes, by inkjet printing of nano-silver paste, without any mask plate, after forming the plurality of second electrodes extending in the second direction different from the first direction, on the second side of the base substrate opposite to the first side.

* * * * *